Dec. 31, 1968 F. BROUWER ETAL 3,419,680

FACSIMILE PHASING SYSTEM

Filed June 21, 1965

INVENTORS
Frans Brouwer
Dudley Gray

By William J. Herman
Attorney

United States Patent Office 3,419,680

Patented Dec. 31, 1968

3,419,680
FACSIMILE PHASING SYSTEM

Frans Brouwer, Glencoe, and Dudley Gray, Chicago, Ill., assignors to Stewart-Warner Corporation, Chicago, Ill., a corporation of Virginia Filed June 21, 1965, Ser. No. 465,389
12 Claims. (Cl. 178—69.5)

ABSTRACT OF THE DISCLOSURE

A phasing system for facsimile or the like by which phasing pulses from a remote transmitter are compared with locally generated pulses corresponding to the rotation of a scanning means in the receiver. A first driving means is provided for rotating the receiver scanning means at the standard frequency of the transmitter and a second driving means is provided for operating the scanning means at a frequency slightly different than the standard. The phase comparing circuit causes the scanning means to be driven by the different frequency drive means if the generated pulses do not coincide with the received phasing pulses and cause a shift to the standard frequency driving means when the pulses do coincide.

Figures 1, 2:
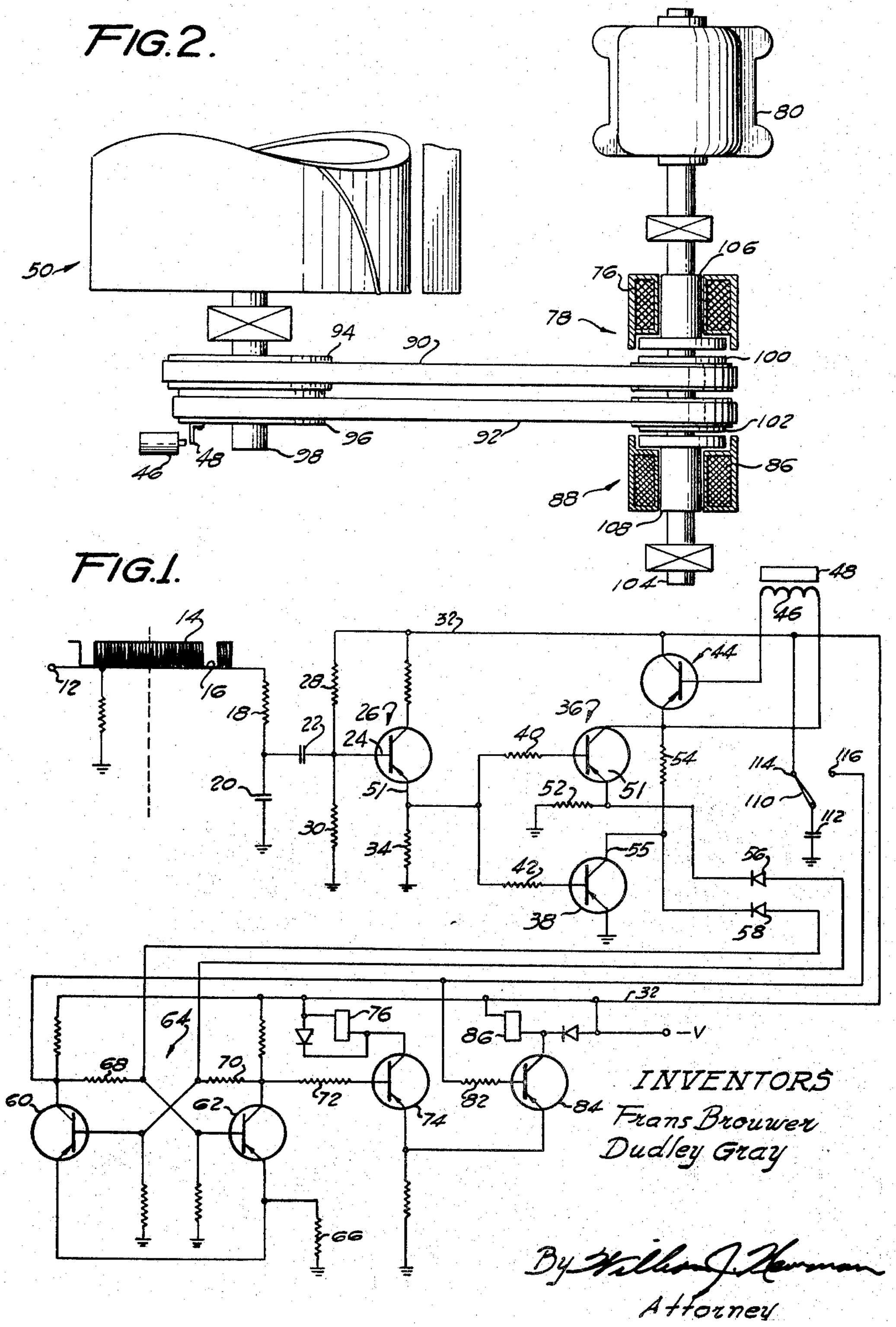

This invention relates to facsimile systems, and more particularly to systems for controlling a facsimile receiver responsive to signals from a remotely located facsimile transmitter.

A facsimile system operates to optically scan a desired document, generate electrical signals responsive thereto and transmit the electrical signals to one or more remote locations by wire or radio means where a copy of the document is reproduced. In one type of facsimile system the document is optically scanned by means of a rotating opaque disc having a spiral slit which cooperates with a linear slit in a fixed opaque member. The opening defined by the two intersecting slits sweeps across the document in a line by line manner as the document is slowly moved therepast. The light reflected by the document through the linearly sweeping opening produces electric signals which are transmitted to the receiver. The facsimile receiver comprises a helical electrode mounted on a rotating cylinder which cooperates with an axially aligned linear electrode to provide an electric marking signal through an electrolytic recording medium passing between the two electrodes. The current passing through the recording medium produces marks having a color density responsive to the light intensity of the corresponding portion of the document being optically scanned at the transmitter. Thus, the recording means in the receiver is a scanning device operating in a line by line manner similar to the facsimile transmitter.

It is important in a line by line facsimile system such as described that the scanning devices in the transmitter and receiver be properly synchronized so that each line reproduced at the receiver is a replica of the line scanned at the transmitter.

The transmitter scanning device and the receiver scanning device must operate at the same frequency, and this is accomplished by driving the scanning devices with synchronous motors energized either by a single commercial power source or by highly accurate individual frequency-stabilized power supplies.

The scanning devices must also be properly phased with respect to each other so that the beginning of a scanned line at the receiver corresponds to the beginning of a scanned line at the transmitter. Since synchronous motors generally have more than a single pair of poles the fact that the respective transmitter and receiver synchronous motors are driven at the same speed does not guarantee that they are properly synchronized. A respective pole by pole alignment must be maintained between the transmitter and receiver motors to obtain proper document copy.

In the past the pole by pole alignment of the scanning devices was accomplished by the transmission of phasing signals generated responsive to each rotation of the transmitter scanning device during an initial phasing period prior to document transmission. This phasing signal was compared with a commutator generated signal from the receiver scanning device and if there was a phase difference the resultant was used to periodically break the energization circuit of the receiver synchronous motor, causing its rotor to slip back one or more poles. A facsimile system incorporating this type of phasing system is shown in U.S. Patent No. 3,013,121 issued to R. W. Castor on Dec. 12, 1961.

That type of system worked satisfactorily at relatively low facsimile reproduction speeds of the order of 120 to 360 lines per minute, providing the phase of the electric power at the input to each of the synchronous motors is in phase, or that no misalignment occurred between either of the scanning devices and the rotors of their respective drive motors. For example, when the transmitter and receiver are operating from the same commercial power source, circuit conditions can occur which shift the phase of the power delivered to one or the other motors. When the transmitter and receiver are operating by separate commercial sources requiring separate, frequency-stabilized power supplies inherent phasing problems are prevalent because the outputs of the separate power supplies are randomly phased with respect to each other. Also, if a shift occurs in the mechanical position of either of the scanning devices with respect to the position of the rotor of its synchronous motor due to belt slippage or the like, the copy will not be true reproduction.

High speed facsimile systems operating in the order of 900 lines per minute and above have additional problems because of the high frequency of the phasing signals. The phasing pulses generated by the facsimile transmitter are generally so short that the receiver synchronous motor can not accurately follow the phasing information. That is, the inertia of the rotor may be too high to allow it to slip a pole each time a phasing pulse is received. The phasing action is thus sporadic and may not permit proper alignment in the time period allotted for the phasing operation.

It is therefore an object of this invention to provide a unique phasing system for facsimile apparatus.

It is also an object of this invention to provide a facsimile phasing system in which the phasing operation in the receiver is not related to the number of poles in the respective synchronous motors or the position of the rotor with respect to the position of the respective scanning devices.

Another object of this invention is to provide a facsimile phasing system which is operable with higher speed facsimile machines.

It is also an object of this invention to provide a phasing system which accurately aligns the phase of the receiver scanning device directly with the phase of the transmitted phasing signal.

Still another object of this invention is to provide a phasing system for facsimile apparatus which eliminates the need for brush and commutators in the facsimile receiver for phasing purposes.

Other objects and advantages of this invention will become readily apparent upon a further reading of this specification, especially when taken in view of the accompanying drawings in which:

FIG. 1 is a schematic diagram of a receiver phasing system embodying the principles of this invention; and FIG. 2 is a partial view of a facsimile receiver scanning recorder showing the drive means therefor.

Briefly, a system embodying this invention for controlling the phase of the rotary scanning device comprises a first drive means for operating the receiver scanning device at the synchronizing frequency of the pulses in the phasing signal received from the transmitter. A second drive means is provided for driving the receiver scanning device at a frequency slightly different and preferably higher than the frequency of the pulses in the phasing signal. The phase of the rotations of the scanning device are compared with the phase of the phasing signal pulses and if they do not occur simultaneously the second driving means drives the scanning device at a slightly different speed until it is in phase with the received phasing signal. The first drive means is then actuated to drive the scanning device at the synchronizing frequency.

Referring first to the schematic diagram of the phasing system 10 in FIG. 1, the phasing signal is received at terminal 12 during the phasing portion of transmission prior to the transmission of document copy information. Generally the incoming phasing signal consists of a full carrier amplitude portion 14 for the major part such as 92½% of the line and a no-carrier portion 16 for the remainder of the line. This no-carrier portion 16 is called the "phasing blank."

Prior to its receipt at terminal 12 the phasing signal is amplified and full wave rectified by the receiver input circuits so that the signal thereat is varying between zero and a positive voltage. Resistor 18 and capacitors 20, 22 remove the carrier component from the signal and couple it to the input at the base 24 of transistor 26. In the quiescent state transistor 26 is biased above cutoff by a negative voltage provided by means of voltage divider resistors 28, 30 between a negative DC power line 32 and ground. During the positive going carrier portion 14 of the signal the base 24 is maintained at cutoff potential and changed to a negative saturation bias during the phasing blank 16 by the discharge of coupling capacitor 22 through resistor 30. Since transistor 26 is connected as an emitter follower amplifier the output across emitter resistor 34 comprises negative pulses corresponding to the negative going phasing blanks 16. The negative pulse signal is transmitted to the base inputs of two transistors 36 and 38 through respective base resistors 40, 42. The emitter to collector circuits of each of the transistors 36, 38 are series connected with the emitter to collector circuit of transistor 44 between ground and the negative DC voltage line 32. Thus, transistors 36 and 38 will conduct responsive to the negative pulses appearing at their respective bases only if transistor 44 is concurrently rendered conductive.

Transistor 44 is triggered into conduction by pulses generated in a magnetic pick-up coil 46 connected between its base and emitter, and the pulses in coil 46 are generated by a magnet 48 fixed for rotation with the receiver recorder scanning device 50 shown in FIG. 2 and described in detail hereinafter. The coil being fixed with respect to the rotating magnet 48 generates pulses responsive to a reference position of the scanning device which is to coincide with a reference position of the transmitter scanning device (not shown) as represented by the phase position of the phasing blank 16 in the received signal.

The combination of transistors 36 and 44 may be considered a first "and" circuit since the output at emitter 51 goes from approximately zero voltage to a negative value and back to zero responsive to the simultaneous negative pulses at their base inputs. Its Boolean equation would be $Q_{36} \cdot Q_{44} = 1$, where $Q_{36}$ represents the conducting state of transistor 36 and $Q_{44}$ represents the on state of transistor 44. The combination of transistor 38 and transistor 44 may be considered a second "and" circuit since the output at the collector 55 goes from zero to a negative value responsive to the simultaneous occurrence of a generated pulse at the base input of transistor 44 and the absence of a phasing blank at the base input of transistor 38. Its Boolean equation would be $\overline{Q}_{38} \cdot Q_{44} = 1$ where $\overline{Q}_{38}$ represents the non-conducting state of transistor 38.

The outputs of the two "and" circuits are respectively coupled through diodes 56, 58 to the bases of transistors 60, 62 connected as a bistable multivibrator 64. Resistor 66 connected between the emitters of the transistors 60 and 62 and ground serves as a constant emitter current source and the resistors 68, 70 provide the feed-back current paths between the two transistors. When transistor 60 is in its conducting state the voltage at its collector, and hence at the base of transistor 62, approaches zero to maintain transistor 62 in its non-conducting state. Likewise, when transistor 62 is in its conducting state the voltage at the base of transistor 60 approaches zero to cause it to be in its non-conductive state.

Which state the bistable multivibrator 64 is at depends upon the output signals from the two "and" circuits. That is, if the "and" circuit made up of transistors 36, 44 produces an "and" output responsive to the simultaneous receipt of the phasing blank and the generated signal transistor 60 will receive a negative pulse at its base from emitter 51 of transistor 36 putting the multivibrator in its conduction state through transistor 60. On the other hand, if a phasing blank signal is not received concurrently with the signal generated by the coil 46, a negative going pulse appears at collector 55 of transistor 38 and hence at the base of multivibrator transistor 62 when the generated signal triggers transistor 44. This negative pulse switches the multivibrator 64 into its opposite state. Thus, the condition of multivibrator 54 in which transistor 60 is conducting and transistor 62 is not conducting represents the condition when the phasing blank and the generated signal occur simultaneously. The state of the multivibrator in which transistor 62 is conducting and transistor 60 is not represents the conditions in which the phasing blank and the generated signal are not occurring simultaneously.

The collector of multivibrator transistor 62 is tied directly through resistor 72 to the base of transistor 74 which drives the coil 76 of a magnetically operated clutch 78 (FIG. 2) to be hereinafter described. The magnetically operated clutch 78 couples the scanning device 50 to a synchronous motor 80. The drive train including clutch 78 is adapted to drive the receiver scanning device 50 at the synchronized speed. Thus the magnetic clutch 78 will be actuated to drive the scanning device 50 at the synchronous speed when the phasing blanks of the received phasing signal and the generated signals occur simultaneously and multivibrator transistor 62 is in its off condition.

The collector of multivibrator transistor 60 is connected through resistor 82 to the base of a transistor 84 for driving the solenoid 86 of a second magnetic clutch 88 (FIG. 2) in the drive train between the motor 80 and the scanning device 50. The clutch 88 provides the linkage for driving the scanning device 50 at the slightly different speed in order to adjust its phase of rotation with the phase of the incoming phasing signal pulses. Thus, when the signals generated in the coil 46 do not coincide with the received phasing blanks, the multivibrator is switched to its state in which transistor 60 is not conducting causing transistor 84 to drive the magnetic clutch 88 driving the scanning device 50 at the slightly different frequency.

In the motor drive apparatus shown in FIG. 2 by which the scanning device 50 is selectively driven at the synchronous speed or a speed slightly different than the synchronous speed, a pair of toothed timing belts 90, 92 are provided with their respective pulleys 94, 96 keyed to the shaft 98 for rotating the scanning device 50. The belts 90 and 92 are driven by respective drive pulleys 100, 102 which are free to axially slide and rotate with respect to the drive shaft 104 of the synchronous motor 80.

The magnetic clutches 78 and 88 comprise their respective solenoids 76, 86 which co-act with the armatures 106, 108 to complete the drive linkages between the motor and the scanning device. The armatures 106, 108 are keyed and thereby fixed to the motor drive shaft 104 so that when their respective solenoids 76, 78 are energized the respective drive pulleys 100, 102 will be attracted causing them to rotate therewith.

In one system utilizing this invention the two pulleys 100 and 102 each have 24 teeth, whereas pulley 94 has 48 teeth and pulley 96 has 47 teeth. Thus, the motor rotating at 1800 revs. per min. will drive the scanning device 50 through clutch 78 at 900 revs. per min. or a recording speed of 900 lines per minute, whereas the scanning device will be driven at a speed of approximately 918 revs. per min. through the clutch 88.

In the apparatus shown the magnet 48 is fixed to the pulley 96 which rotates with the scanning device 50, but of course it may be located anywhere so that it will produce pulses in magnetic pickup coil 46 responsive to the rotation of the scanning device.

During the phasing period the circuit 10 shown in FIG. 1 causes the scanning device 50 to be properly synchronized and phased with the phasing blanks. At the end of the phasing period however the incoming signal is removed from the input to the system at terminal 12 (FIG. 1) but the synchronizing speed clutch 78 must be maintained actuated. Capacitor 22 which has been charged by the generally positive phasing signal begins to discharge causing transistor 26 to conduct heavily. The voltage across resistor 34 rises sharply and then descends slowly as capacitor 22 discharges reaching a negative value when the capacitor is fully discharged due to the voltage divider action of resistors 28, 30, holding transistor 26 in a conducting state. The steady negative voltage appearing across resistor 34 also appears at the bases of transistors 36 and 38 so that they are driven into conduction each time the transistor 44 is triggered by the pulses generated through the action of magnet 48 and coil 46. A steady stream of pulses is therefore applied to multivibrator transistor 60 with none appearing at the base of transistor 62 so that the multivibrator is maintained in its state to maintain the synchronous speed clutch 78 actuated.

Manual means are provided for correcting the phase of the scanning device if the automatic means hereinbefore discussed fail to complete the operation during the fixed phasing period at the beginning of transmission. Switch 110 is provided for connecting capacitor 112 from its charging contact 114 to its phasing contact 115 connected to the collector of multivibrator transistor 60. When switch 110 is actuated to its phasing contact 116, the negative voltage charge thereon is applied to the base of multivibrator transistor 52 through resistor 58 bringing it into conduction. Magnetic clutch 88 is thus actuated to drive the scanning device at the non-synchronous speed. When capacitor 112 is fully discharged the pulses generated by the coil 46 will shift the multivibrator to cause clutch 78 to be reactuated. If visual inspection of the copy being reproduced indicates that proper phasing has still not been accomplished the switch 110 may be returned to contact 114 to charge capacitor 112 and then returned to its phasing contact 116 to repeat the process.

It is to be noted that the magnetic pulse generating means 46, 48 and the transistor 44 might be replaced by a conventional brush and commutator system. The magnetic pickup and transistor combination is preferred, however, because it is not subject to wear and also the pulses can be made much narrower, increasing the accuracy of position indication. Also, the system is not limited to a belt drive and can be used with a gear train if desired. The belt drive has the advantage that it is quieter and generally has less inertia.

An important feature of this phasing system is that the non-synchronous speed of the scanning device 50 is only slightly different from the synchronous speed. Thus, the position of the scanning device is changed very little during the time it takes to transfer the drive from clutch 88 to clutch 78. It was previously mentioned that the non-synchronous speed is preferably greater than the synchronous speed and this is because of the natural tendency of the scanning device to slow down during the clutch switching period. However, since the switching time is so short, it has been found that a system will operate properly using a lower non-synchronous speed.

While a preferred embodiment has been shown and described in detail in this specification, it is to be understood that many modifications may be made without materially deviating from the invention. It is therefore intended to be bound only by the scope of the appended claims.

What is claimed is:

1. A system for controlling the phase of a rotary scanning device in a facsimile receiver with respect to a received phasing signal made up of pulses occurring at a predetermined frequency comprising a first drive means for driving said scanning means at said predetermined frequency, second drive means for driving said scanning means at a frequency slightly different than said predetermined frequency, means for generating an electrical pulse for each rotation of said scanning means, a first "and" gate for producing an output signal responsive to the simultaneous occurrence of said phasing and generated pulses, means responsive to the output signal of said "and" gate for actuating said first drive means and deactuating said second drive means, a second "and" gate for producing an output signal responsive to the simultaneous occurrence of said generated pulses and the absence of phasing pulses, and means responsive to the output signal of said second "and" gate for actuating said second drive means and deactuating said first drive means.

2. A system for controlling the phase of a rotary scanning device in a facsimile receiver with respect to a received phasing signal made up of pulses occurring at a predetermined frequency comprising a synchronous motor, a first drive including an electrically operable clutch for connecting said motor to said scanning means to drive said scanning means at said predetermined frequency, a second drive including a second electrically operable clutch for connecting said motor to said scanning means to drive said scanning means at a frequency slightly different than said predetermined frequency, means for generating an electrical pulse for each rotation of said scanning means, a first "and" gate for producing an output signal responsive to the simultaneous occurrence of said phasing and generated pulses, means responsive to the output signal of said "and" gate for actuating said first clutch and deactuating said second clutch, a second "and" gate for producing an output signal responsive to the simultaneous occurrence of said generated pulses and the absence of said phasing pulses, and means responsive to the output signal of said second "and" gate for actuating said second clutch and deactuating said first clutch.

3. A system for controlling the phase of a rotary scanning device in a facsimile receiver with respect to a received phasing signal made up of pulses occurring at a predetermined frequency comprising a synchronous motor, a first drive including an electrically operable clutch for connecting said motor to said scanning means to drive said scanning means at said predetermined frequency, a second drive including a second electrically operable clutch for connecting said motor to said scanning means to drive said scanning means at a frequency slightly different than said predetermined frequency, a magnet carried by said rotary scanning means, a coil adjacent the rotational path of said magnet and fixedly supported with respect thereto for generating an electrical pulse for each rotation of said scanning means, a first "and" gate for producing an output signal responsive to the simultaneous occurrence of said phasing and generated pulses, means responsive to said output signal of said "and" gate for actuating said first clutch and deactuating said second clutch, a second "and" gate for producing an output signal responsive to the simultaneous occurrence of said generated pulses and the absence of said phasing pulses, means responsive to the output signal of said second "and" gate for actuating said second clutch and deactuating said first clutch, and means including said coil and magnet for maintaining said first clutch actuated and said second clutch deactuated during facsimile data recording.

4. The system of claim 3 comprising in addition manual means for actuating said second clutch and deactuating said first clutch for manually adjusting the phase of said scanning device.

5. A system for controlling the phase of a rotary scanning device in a facsimile receiver with respect to a received phasing signal made up of pulses occurring at a predetermined frequency comprising a synchronous motor, a first drive including an electrically operable clutch for connecting said motor to said scanning means to drive said scanning means at said predetermined frequency, a second drive including a second electrically operable clutch for connecting said motor to said scanning means to drive said scanning means at a frequency slightly different than said predetermined frequency, a bistable multivibrator having two inputs and two opposite outputs, means for driving each of said clutches responsive to a respective multivibrator output, a magnet carried for rotation with said rotary scanning means, a coil adjacent the rotational path of said magnet and fixedly supported with respect thereto for generating an electrical pulse for each rotation of said scanning means, a first "and" gate comprising a first transistor rendered conductive during each of said generated pulses and a second transistor rendered conductive during each of the received phasing pulses, means connecting the output of said "and" gate to one input of said multivibrator for driving same into one stable state to actuate said first clutch and deactuate said second clutch, a second "and" gate comprising said first transistor and a third transistor rendered non-conducting during the absence of said received phasing pulses, means connecting the output of said second "and" gate to the other input of said multivibrator for driving same into the other stable state to actuate said second clutch and deactuate said first clutch.

6. A system for controlling the phase of a rotary scanning device in a facsimile receiver with respect to a receiver phasing signal made up of pulses occurring at a predetermined frequency comprising a synchronous motor, a first belt drive including an electrically operable clutch for connecting said motor to said scanning means to drive said scanning means at said predetermined frequency, a second belt drive including a second electrically operable clutch for connecting said motor to said scanning means to drive said scanning means at a frequency slightly greater than said predetermined frequency, a bistable multivibrator having two inputs and two opposite outputs, means for driving each of said clutches responsive to a respective multivibrator output, a magnet carried for rotation with said rotary scanning means, a coil adjacent the rotational path of said magnet and fixedly supported with respect thereto for generating an electrical pulse for each rotation of said scanning means, a first "and" gate comprising a first transistor rendered conducting during each of said generated pulses and a second transistor rendered conductive during each of the received phasing pulses, means connecting the output of said "and" gate to one input of said multivibrator for driving same into one stable state to actuate said first clutch and deactuate said second clutch, a second "and" gate comprising said first transistor and a third transistor rendered non-conducting during the absence of said received phasing pulses, means connecting the output of said second "and" gate to the other input of said multivibrator for driving same into the other stable state to actuate said second clutch and deactuate said first clutch, and means including said coil and magnet for providing a signal to said one multivibrator input only during facsimile data recording.

7. The system of claim 6 comprising in addition manual means for providing a signal to said other multivibrator input for manually adjusting the phase of said scanning device.

8. A system for controlling the phase of a rotary scanning device in a facsimile received with respect to a received phasing signal of a predetermined frequency comprising means normally operable to drive said scanning device at said predetermined frequency, second means for driving said scanning device at a frequency slightly different than said predetermined frequency, means for repeatedly comparing the phase difference between the rotations of said scanning device and said received signal, and means operable responsive to said phase comparing means for actuating said second driving means to drive said scanning device at said different frequency until said scanning device is in phase with the received phasing signal.

9. A system for controlling the phase of a rotary scanning device in a facsimile receiver with respect to a received phasing signal of a predetermined frequency comprising means including a clutch normally operable to drive said scanning device at said predetermined frequency, means including a second clutch for driving said scanning device at a frequency slightly different than said predetermined frequency, means for repeatedly comparing the phase of the rotations of said scanning device with the phase of said received signal, and means responsive to said comparing means for actuating said second clutch to drive said scanning means at said different frequency until said scanning means is in phase with the received phasing signal.

10. A system for controlling the phase of a rotary scanning device in a facsimile receiver with respect to a received phasing signal of a predetermined frequency comprising a synchronous motor, means including a first drive train for causing said motor to drive said scanning device at said predetermined frequency, means including a second drive train for causing said motor to drive said scanning device at a frequency slightly different than said predetermined frequency, means for repeatedly comparing the phase difference between the rotations of said scanning device and said received signal, and means operable responsive to said phase comparing means for actuating said second drive train to cause said motor to drive said scanning means at said different frequency until said scanning means is in phase with the received phasing signal.

11. A drive assembly for rotating a scanning device in a facsimile recorder comprising a first pair of pulleys having slightly different diameters fixed to said scanning device, a second pair of pulleys slidably and rotatably mounted on the drive shaft of said motor, a pair of endless flexible drive members each in driving relationship between respective ones of said pairs of pulleys, a first clutch assembly having an armature fixed to the motor drive shaft and adjacent one of said second pairs of pulleys, a second clutch assembly having an armature fixed to said drive shaft and adjacent the other of said second pair of pulleys, said clutch assemblies each having a solenoid coil electrically energizable to selectively engage one of said second pair of pulleys with its adjacent armature.

12. A drive assembly for rotating a scanning device in a facsimile recorder comprising a first pair of pulleys having slightly different diameters fixed to said scanning device, a second pair of pulleys slidably and rotatably mounted on the drive shaft of said motor, a pair of belts each in driving relationship between respective ones of said pairs of pulleys, a first clutch assembly having an armature fixed to the motor drive shaft and adjacent one of said second pairs of pulleys, a second clutch assembly having an armature fixed to said drive shaft and adjacent the other of said second pair of pulleys, said clutch assemblies each having a solenoid coil surrounding its respective armature and electrically energizable to selectively slide one of said second pair of pulleys into attractive engagement with its adjacent armature.

References Cited

UNITED STATES PATENTS

| | | | |
|---|---|---|---|
| 2,704,306 | 3/1955 | McFarlane et al. | 178—69.5 |
| 3,027,425 | 3/1962 | Tannebaum | 178—69.5 |

ROBERT L. GRIFFIN, *Primary Examiner.*

R. L. RICHARDSON, *Assistant Examiner.*